United States Patent [19]
Converse, III et al.

[11] 3,851,523
[45] Dec. 3, 1974

[54] APPARATUS FOR TESTING CARBURETORS

[75] Inventors: Vernon G. Converse, III, Franklin; Angelo A. Lizzio, Dearborn, both of Mich.

[73] Assignee: Scans Associates, Inc., Livonia, Mich.

[22] Filed: July 13, 1972

[21] Appl. No.: 268,534

Related U.S. Application Data

[63] Continuation of Ser. No. 81,203, Oct. 16, 1970, abandoned.

[52] U.S. Cl. .............................................. 73/118
[51] Int. Cl. .......................................... G01m 19/00
[58] Field of Search ..................... 73/118, 3, 119 R

[56] References Cited
UNITED STATES PATENTS

| | | | |
|---|---|---|---|
| 2,414,582 | 1/1947 | Crosby et al...................... | 73/118 X |
| 3,349,619 | 10/1967 | Millar.............................. | 73/205 L |
| 3,524,344 | 8/1970 | Converse et al................. | 73/213 X |

*Primary Examiner*—Jerry W. Myracle
*Attorney, Agent, or Firm*—D. Edward Dolgorukov

[57] ABSTRACT

This application discloses an improved apparatus for testing carburetors on production basis and giving simultaneously with the test continuous and direct indication of the mixture ratio produced by test carburetors, as well as deviation of such mixtures from prescribed standard. The apparatus is adapted to reproduce in a test carburetor a predetermined air flow and manifold vacuum known to occur in such carburetors at a certain point of its operation. With such air flow inducing a definite fuel flow in a test carburetor, the rate of fuel flow is measured and amplified. The signals produced by the measuring device, which signals may be pneumatic, electric or hydraulic, are impressed on an analog computer capable of dividing one value by the other and thus to produce another signal related to or representative of the mixture ratio produced by the carburetor. Such ratio is indicated on a specially graduated pressure indicating device, or an electric indicating device, and thus gives a direct and continuous reading of the mixture ratio produced by the carburetor. The construction disclosed is substantially similar to that disclosed in the U.S. Pat. No. 3,517,552 and U.S. Pat. No. 3,524,344, the main difference being found in the fact that in the present construction, the air flow measurements are made on the upstream side of the test carburetor rather than on the downstream side thereof as in the above-mentioned patents.

4 Claims, 6 Drawing Figures

APPARATUS FOR TESTING CARBURETORS

This is a continuation of application Ser. No. 81,203 filed Oct. 16, 1970 now abandoned.

The present invention relates to an improved method and apparatus for testing carburetors on a production basis. The construction disclosed herein is somewhat similar to that disclosed in U.S. Pats. Nos. 3,517,552 and 3,524,344 to V. G. Converse, et al. However, while those patents disclose constructions in which the measurements of the air flow are taken on the downstream side of the test carburetors, the present application discloses a system in which the measurements of the air flow are taken on the upstream side thereof.

One of the objects of the present invention is to provide an improved method and apparatus for testing carburetors whereby the difficulties and disadvantages of the prior constructions are overcome and largely eliminated and a much simpler and more accurate carburetor testing system is thus produced without increasing costs and, in fact, with substantial reduction thereof.

Another object of the present invention is to provide a system for testing carburetors having a critical flow venturi meter either of variable area or of a constant area, in which measurements of the air flow are taken on the upstream side of the carburetor.

A further object of the invention is to provide a system for testing carburetors which system has an air pressure and temperature control for the incoming air whereby incoming air is at a predetermined pressure and temperature.

A still further object of the invention is to provide an improved system for testing carburetors in which the air flow measurements are taken not at venturi meters but at laminar flow units.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

It should be understood that this system requires operation of a carburetor inside of a hood and also requires a reasonable amount of fuel separation in the chamber to prevent air contamination. A manifold vacuum controller and appropriate valve to regulate the chamber pressure is also required. Also, a system, either hydraulic or electric would be required for operation of the throttle of the carburetor. Also, a fuel supply and measurement system, either pneumatic or electric would be required as in the above-mentioned patents. Also, this upstream air flow measurement system requires the addition of a positive pressure supply with an absolute pressure controller to control the upstream pressure of the variable area critical venturi meters. The absolute pressure between the absolute pressure controller valve and the variable area critical flow venturi meter would have a relationship to air flow. This relationship, when attempting to achieve a specific air flow would drive the motor of the variable area critical flow venturi meter until the encoder reached the predetermined calibrated position.

If the system were to be used without a computer, manual adjustments of the variable area critical flow venturi meter would be necessary either through servo systems or hand controls, and digital display of air flow ratio and fuel flow could still be achieved by substituting an analog computer in place of the digital computer.

It will be understood that attaining the desired result is done in large measure by the provision of accurate measuring means for the variable area venturi device, which means are based in a large degree on accurate measuring of the position of the control member of the venturi, and relating by accurate calibration of such position to the effective area of the venturi and the maximum air flow rate at such position. While it is possible to calibrate the venturi for any desired pressure difference, it is preferable to do so for critical condition of venturi operation and to use the venturi device also under critical conditions.

Figure 1:
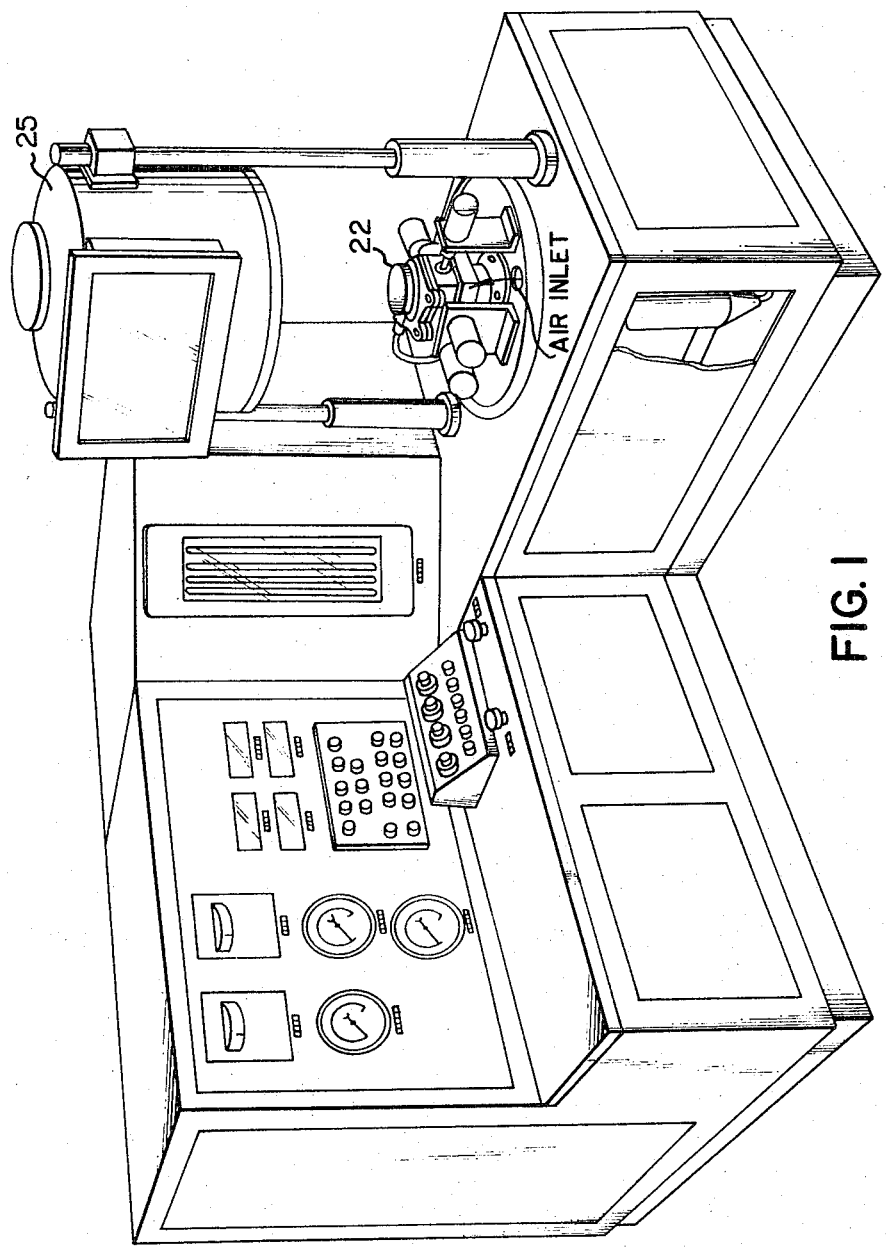
FIG. 1 is a perspective view showing a complete system for testing carburetors, embodying the present invention, with its windowed hood or test carburetor cover being shown raised.
Figure 2:
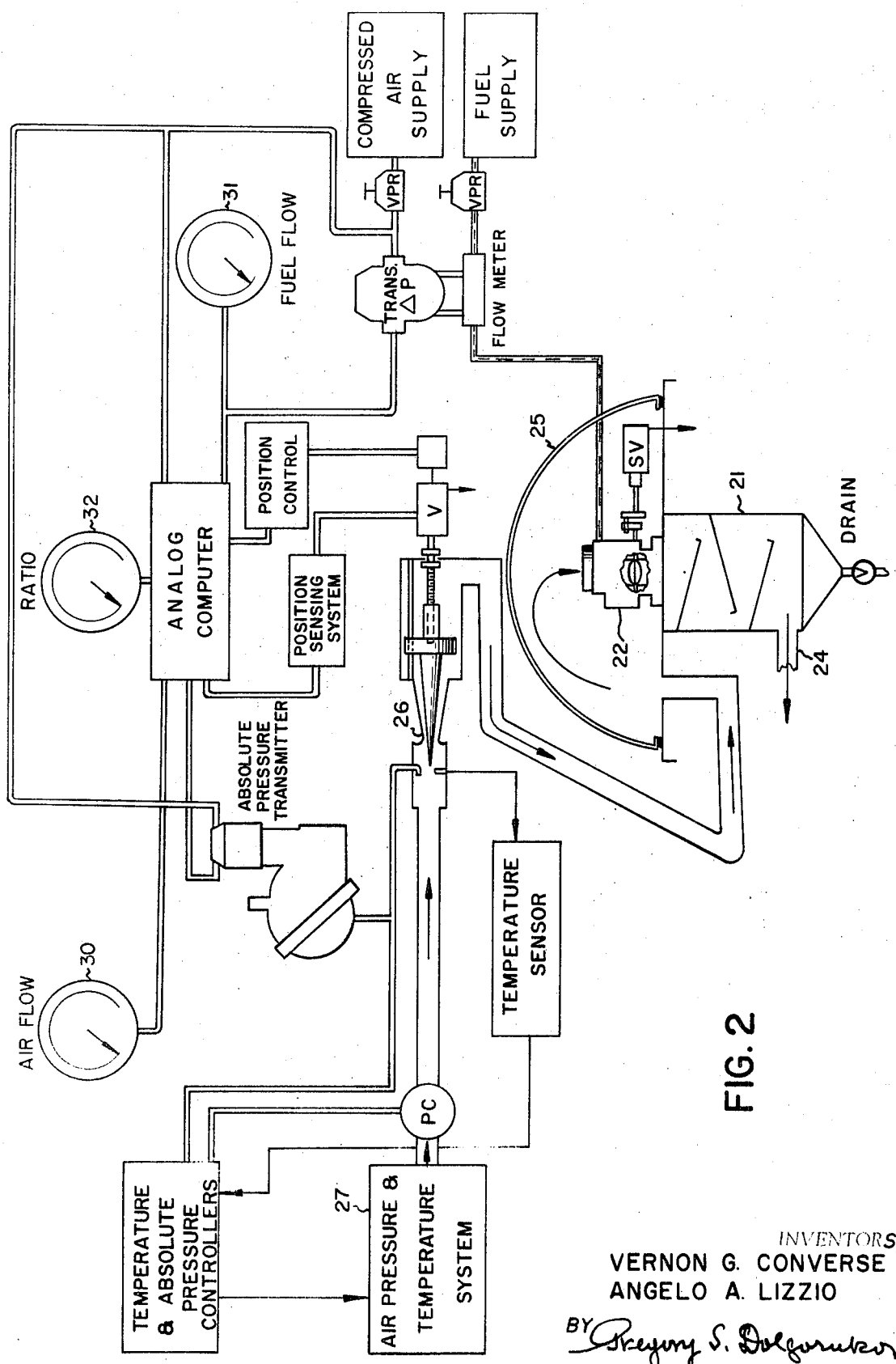
FIG. 2 is a diagrammatic view of a carburetor testing system with a single variable area venturi meter.

Referring specifically to FIG. 2, the carburetor testing unit embodying the present invention and shown therein comprises, generally, an "operation condition reproducing system" and a "mixture ratio determining and indicating system." The system comprises a hollow stand including a chamber 21 communicating with the inner passage of the test carburetor 22. The test carburetor is received at the top of the stand and held securely in place thereat in the process of the test. Conduit 24 of the chamber 21 is connected to a suitable source of vacuum (not shown). The carburetor 22 operates under the hood or cover 25. The capacity of the vacuum pump means is amply sufficient to induce maximum flow of air and fuel mixture through the carburetor and, in fact, has an excess of such capacity. The vacuum produced within chamber 21 and through the passage of the carburetor and under the hood 25 produces a corresponding flow through the venturi 26 with the air being supplied from the source 27.

The source 27 is adapted to supply air at a uniform predetermined pressure and temperature to ensure uniform reading. Such pressure and temperature may be atmospheric pressure and temperature such as 70°F., or it may be reduced pressure corresponding to any selected elevation and temperature common thereat.

The measurements of the air flow and of the fuel flow and its indication on the devices 30 and 31 is similar to that used in the above-mentioned patents. Similar is also the method of impressing these values on the analog computer for obtaining a mixture ratio, and indicating it on the device 32.

This system can be successfully used with venturi meter having a constant effective area of its throat as well as with venturi meter having adjustably varying area of the throat. In the latter case a control cone is mounted within the venturi and is movable therein to vary selectively the effective area of the venturi throat and thus to vary correspondingly the air mass flow rate. The means moving the control cone within the venturi are in the form of an irreversible screw-and-nut mechanism and an electric stepping motor controlling said mechanism, the measuring means being in the form of an encoder device operated by said motor and providing indications of cone positions on the basis of the number of revolution steps of the stepping motor.

Figure 3:
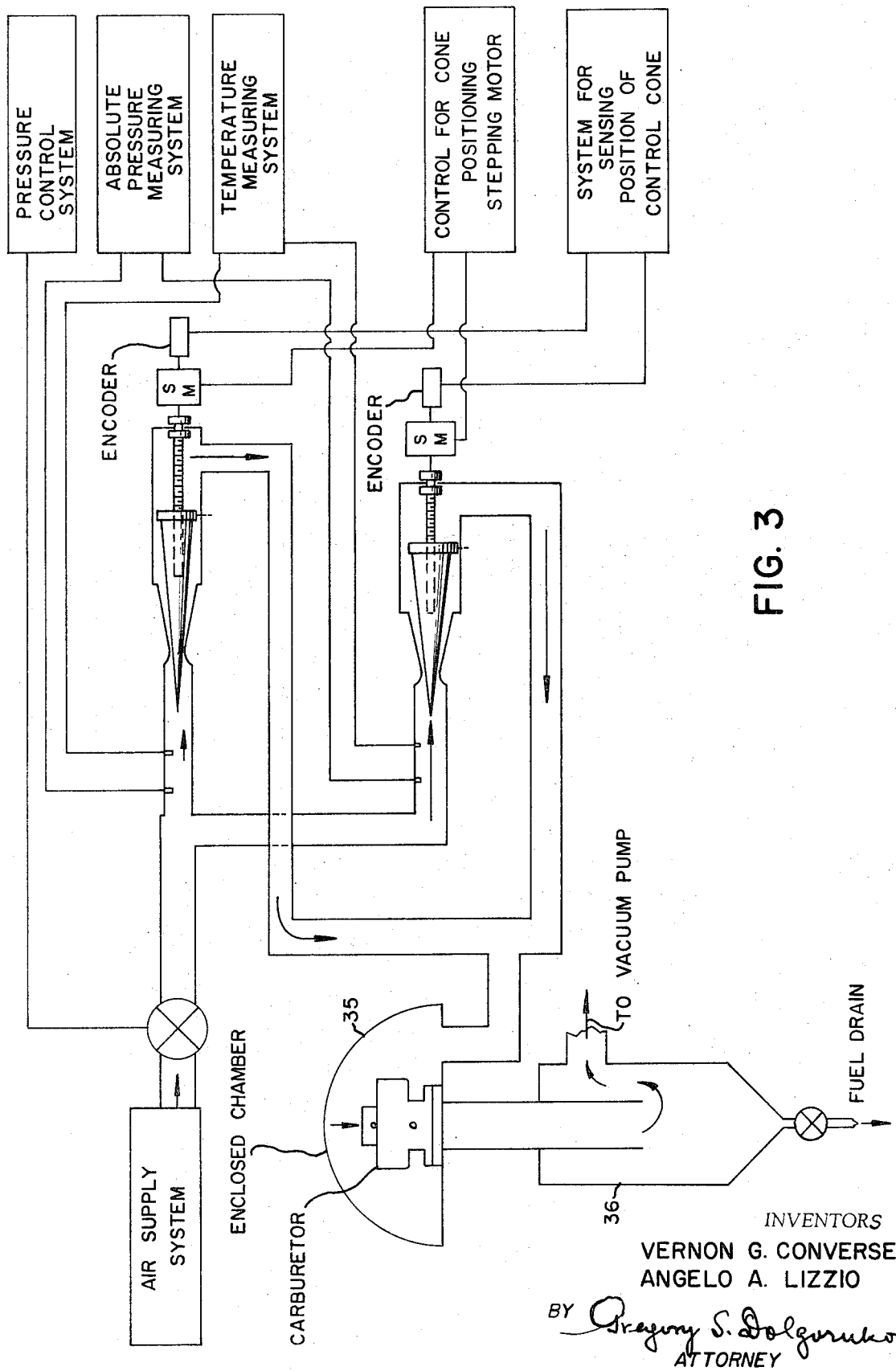
FIG. 3 is a diagrammatic view of a carburetor testing system determining air-to-fuel ratio of test carburetors, in which system the mass air flow rate is controlled by a pneumatically set carburetor throttle co-operating with two critically operated variable area venturi meters arranged in parallel.

FIG. 3 shows a system with two variable venturi meters, both supplied from the same source of air. Upon passing through the venturi meters, the air is delivered under the hood 35 under which the carburetor is operating being connected to the chamber 36 interconnected to a vacuum pump (not shown).

Figure 4:
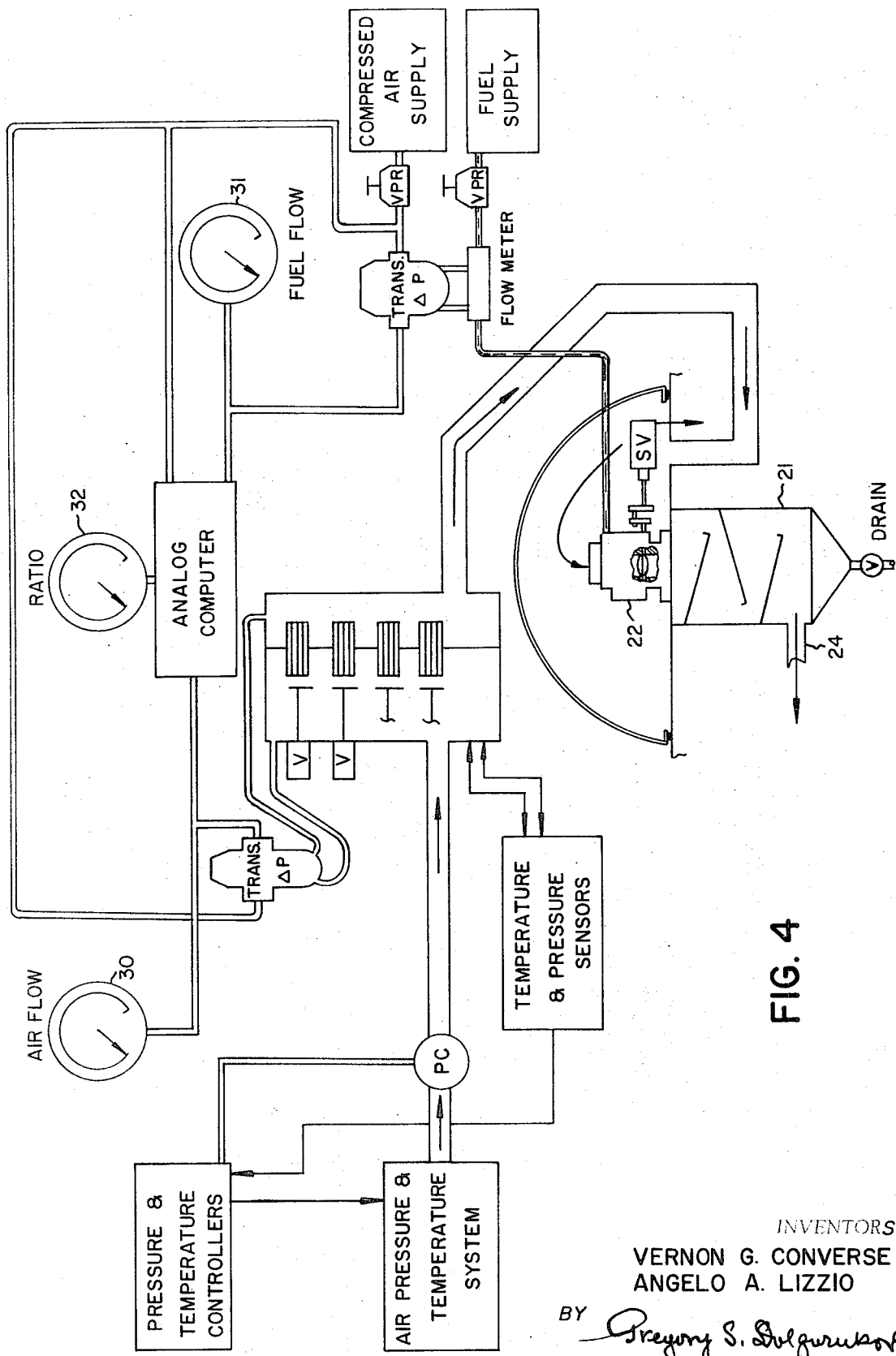
FIG. 4 is a diagrammatic view of a carburetor testing system with laminar air flow units.

FIG. 4 shows a similar system with laminar flow. In this system the air flow is measured at laminar units which are also adapted to straighten out the flow and to eliminate any turbulences that may be present. Laminar units are commercially available and need not be described herein in detail. One type of such units that gives satisfactory service is manufactured by the Meriam Instrument Co. of Cleveland, Ohio. Such units comprise a laminar element consisting of a series of parallel channels disposed within a conduit and having pressure-measuring connections at its ends.

Four laminar units 38 are shown in FIG. 4. Measurements can be taken with one unit only or with any combination of units. The system shown in FIG. 4 is fully pneumatic.

For electrical system transmitters will be adapted to give electrical signal to air flow indicator 30 and fuel flow indicator 31 as well as to a force bridge analog computer to give electrical signal to ratio indicator 32. Such a system is shown in FIG. 5 wherein electrical transmitters 40 and 41 are used.

It should be understood that with the laminar units the flow of air is subsonic and will not be critical.

One of the advantages of the system with laminar flow units is its considerable reduction in cost as compared with the system using variable area venturi meters.

Figure 5:
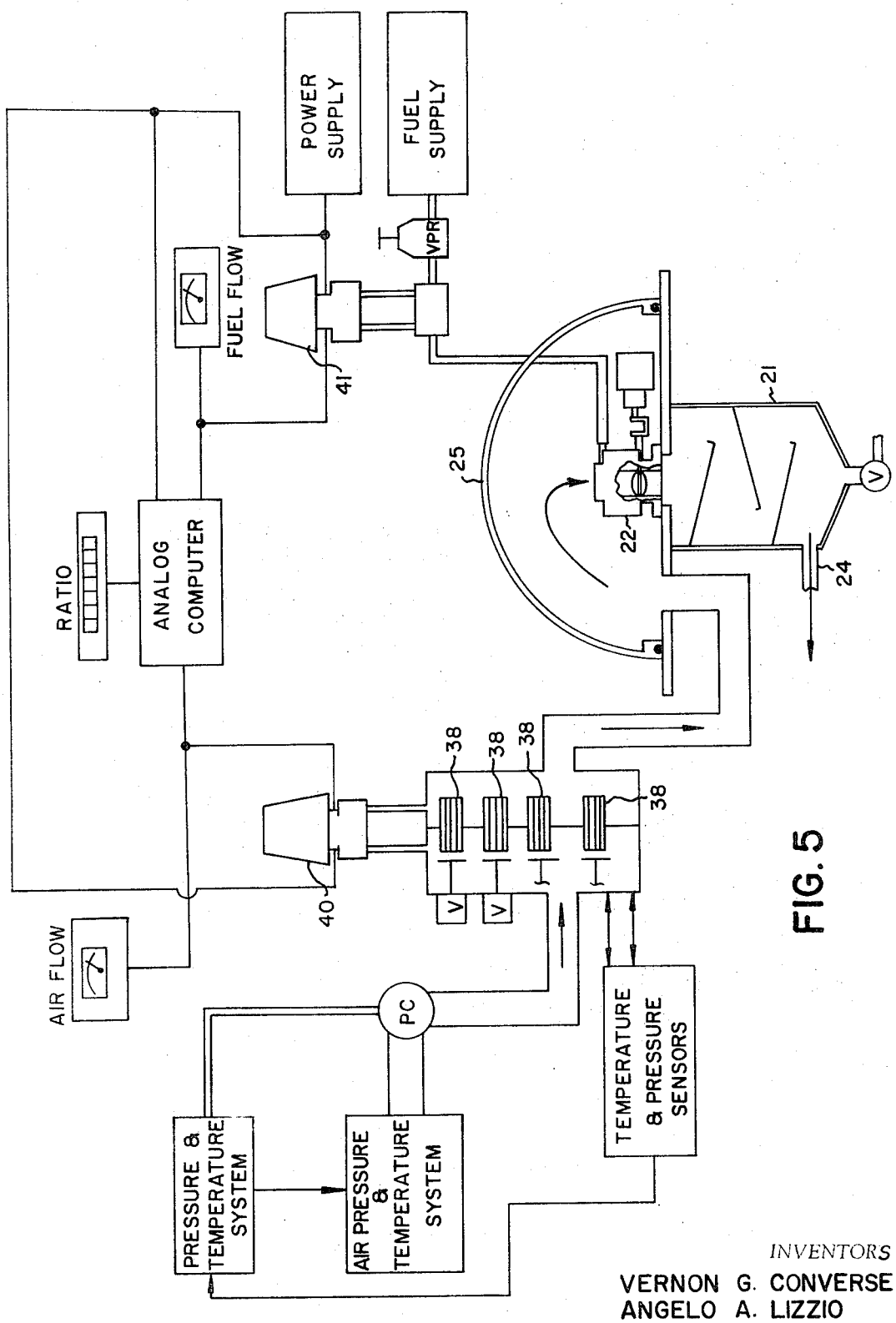
FIG. 5 is a diagrammatic view showing a system with laminar air flow units used for measuring the air flow and electrical transmitters for flow indicators.
Figure 6:
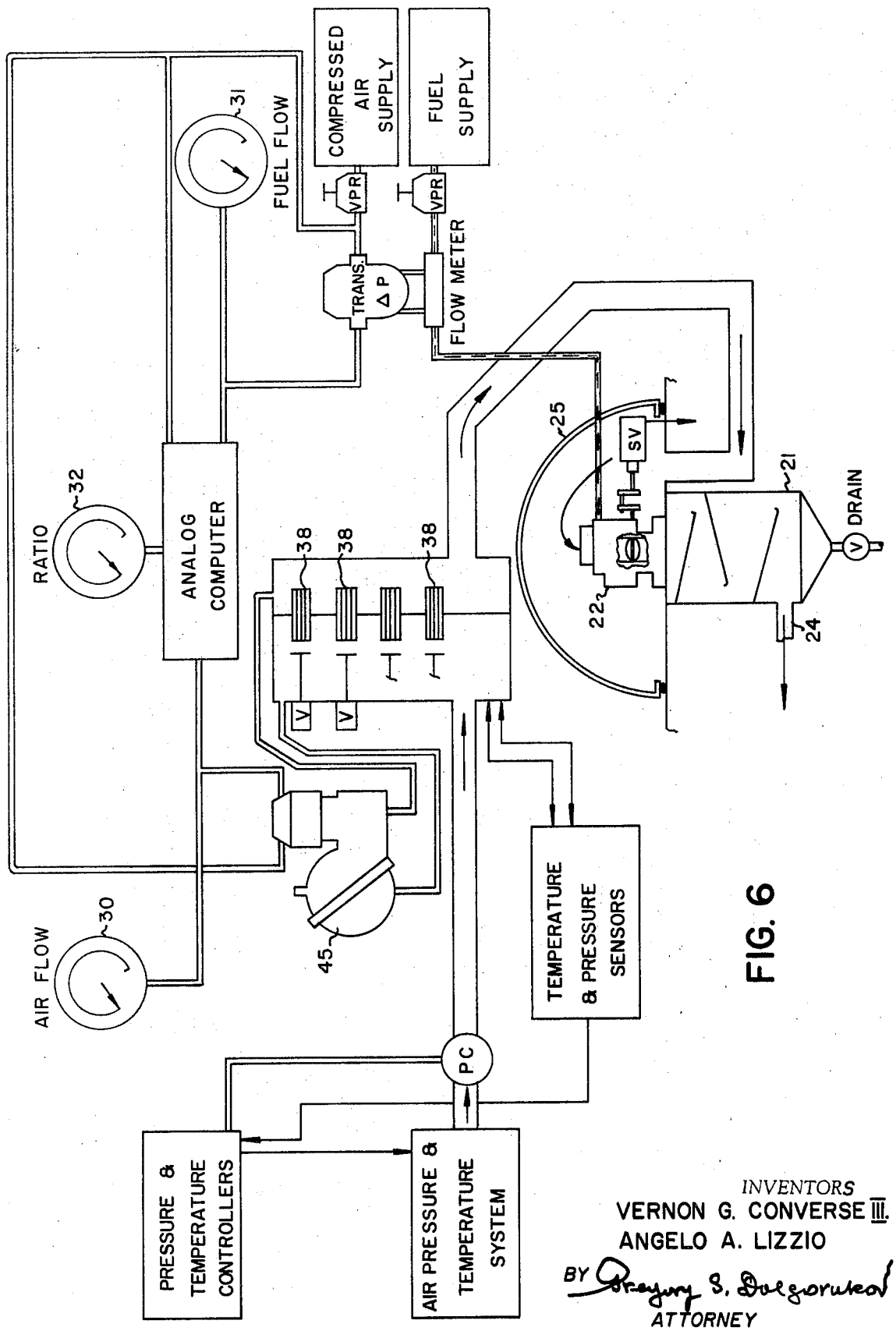
FIG. 6 is a diagrammatic view showing a pneumatic system similar in part to that of FIG. 4 but having a transmitter of different type.

FIG. 6 shows a system which is similar to that shown in FIG. 5 except that it has a transmitter 45 of a different type, namely one similar to that used in the construction of FIG. 2.

There is thus provided an improved system for testing carburetors whereby the objects of the invention listed above and numerous additional advantages are attained.

We claim:

1. An apparatus for testing carburetors at a plurality of points of operation range thereof, said apparatus including a sealed chamber adapted to sealingly receive a test carburetor and hold it in place during the test, a venturi meter having a throat adapted to be operated critically at all points of its operating range outside said chamber and sealingly connected to said chamber on the upstream side of the carburetor throttle, means to create vacuum on the downstream side of the carburetor throttle, measuring means entirely on the upstream side of said venturi meter adapted to measure the actual rate of air flow to produce a continuous sensible signal related to said rate, means adapted to measure the actual rate of the resulting fuel flow through the carburetor to produce a second continuous sensible signal related to said rate of fuel flow, a device adapted to receive and to divide the value of one signal by the value of the other signal and thus to produce a third continuous signal related to the ratio of said two signals, an indicating device responsive to said third signal and adapted to give a continuous indication related to the mixture ratio produced by the test carburetor, and an air pressure and temperature device entirely upstream of said venturi meter adapted to provide a source of conditioned air to be drawn through the test carburetor.

2. The apparatus defined in claim 1, with the venturi meter thereof having a control cone mounted within the venturi passage and moveable therein to vary selectively the effective area of the venturi throat and thus to vary correspondingly the air mass flow rate, and measuring means relating position of said moveable control cone to the air mass flow rates at positions of said control cone throughout the operation range of the venturi meter.

3. The apparatus defined in claim 2, and including two variable area critical flow venturi meters, both provided on the upstream side of the test carburetor throttle and arranged in parallel.

4. An apparatus for testing carburetors at a plurality of points of the operation range thereof, said apparatus including a sealed chamber adapted to receive sealingly a test carburetor and to hold it in place during the test, a conduit outside of said sealed chamber having a plurality of laminar flow units operatively arranged therein and sealingly connected to said chamber on the upstream side of the carburetor throttle, means to create vacuum on the downstream side of the carburetor throttle, measuring means upstream of said laminar flow unit to measure the actual rate of air flow in order to produce a continuous sensible signal related to said rate, means to measure the actual rate of the resulting fuel flow through the carburetor in order to produce a second continuous sensible signal related to said rate of fuel flow, a device adapted to receive and to divide the value of one signal by the value of the other signal and thus to produce a third continuous signal related to the ratio of said two signals, and an indicating device responsive to said third signal and adapted to give a continuous indication related to the mixture ratio produced by the test carburetor, and an air pressure and temperature device provided entirely upstream of said laminar flow units and adapted to produce a source of conditioned air to be drawn through the test carburetor.

* * * * *